United States Patent [19]

Wilson, Norman A.

[11] 3,995,353
[45] Dec. 7, 1976

[54] MULTI GROOVE ROLL MOUNTING MEANS

[75] Inventor: Norman A. Wilson, Shrewsbury, Mass.

[73] Assignee: Morgan Construction Company, Worcester, Mass.

[22] Filed: Dec. 10, 1975

[21] Appl. No.: 639,296

[52] U.S. Cl. .................................. 29/121.6; 29/125; 72/199

[51] Int. Cl.² ...................................... B21B 27/02

[58] Field of Search ............ 29/121 R, 121 A, 125, 29/132, 129.5; 72/199, 221, 238, 247; 184/6

[56] References Cited

UNITED STATES PATENTS

| | | | |
|---|---|---|---|
| 2,159,290 | 5/1939 | Penkala | 72/238 |
| 3,398,563 | 8/1968 | Jones et al. | 72/221 |
| 3,447,351 | 6/1969 | Werntz | 29/125 X |
| 3,545,371 | 12/1970 | Reist | 29/125 X |
| 3,616,671 | 11/1971 | Notari | 72/238 X |
| 3,866,283 | 2/1975 | Gould | 29/121 R |

Primary Examiner—Alfred R. Guest
Attorney, Agent, or Firm—Thompson, Birch, Gauthier & Samuels

[57] ABSTRACT

Apparatus for mounting a multi groove work roll on a roll shaft in a rolling mill. The apparatus includes a shoulder on the roll shaft, a spacer assembly on the roll shaft in engagement at one end with the shoulder, the opposite end of the spacer assembly being in engagement with a work roll axially received on the roll shaft, and a retainer assembly for holding the work roll against the spacer assembly in an operative position with one of the roll grooves aligned with the mill pass line. The spacer assembly includes at least two axially engaged components, one of which is reversible endwise relative to the other in order to change the overall axial length of the spacer assembly to thereby shift the roll axially through an appropriate distance to make use of additional grooves on the work roll.

10 Claims, 5 Drawing Figures

MULTI GROOVE ROLL MOUNTING MEANS

DESCRIPTION OF THE INVENTION

This invention relates generally to rolling mills, and is concerned in particular with a new and improved apparatus for mounting multi groove work rolls.

As herein employed, the term "multi groove work roll" is defined as a work roll adapted for mounting on the end section of a roll shaft and having at least three grooves on the exterior surface thereof, with the axial spacing between the centers of adjacent grooves being equal, and with the axial spacing between each outside groove and the adjacent roll end also being equal.

In the past, a number of arrangements have been employed in the mounting of grooved work rolls on the end sections of roll shafts. In some of the earlier arrangements, the work rolls were provided with single grooves which required that the rolls be replaced when the grooves become worn. After removal, a roll with a worn groove was either reground, or if this was no longer possible, the roll was simply discarded.

In order to improve roll life, double groove rolls were later developed. With such rolls, after one groove was worn, the roll was reversed to make use of the other groove, and hence a significant improvement in roll life was realized. Other prior art arrangements made use of rolls having more than two grooves with means for axially adjusting the roll shafts in order to align the roll grooves with the mill pass line. However, because of the need to accommodate axial adjustment of the roll shafts when aligning different roll grooves with the mill pass line, these arrangements involved the use of expensive and complicated shaft bearings and drive gearing. Still other prior art arrangements, for example those shown in U.S. Pat. Nos. 1,858,788 and 3,866,283, made use of removable spacer elements to axially shift multi groove rolls on the roll shafts. However, when not in use on the roll shafts, the removable spacer elements were susceptible to loss or damage, thus creating other maintenance problems for the mill owner.

It is, accordingly, a general object of the present invention to provide an improved spacer assembly for use in axially locating a multi groove work roll on the end section of a roll shaft.

A more particular object of the present invention is the provision of a spacer assembly including at least two axially engaged components, one of which is reversible endwise of the other in order to change the overall axial length of the spacer assembly. By relying on reversible rather than removable components for the spacer assembly all components are always in use, thus materially lessening the likelihood of components becoming lost or damaged.

The spacer assembly of the present invention is axially mounted on the roll shaft between the multi groove work roll and a shoulder on the roll shaft. A retainer assembly holds the work roll against the spacer assembly, with one of the roll grooves aligned with the mill pass line. After this one groove is worn, the retainer assembly is disengaged temporarily and the work roll is reversed to make use of another roll groove. Thereafter, the axial length of the spacer assembly is altered by reversing one of its components, the result being that when the roll is remounted, it is shifted along the roll axis through a distance equal to the change in axial length of the spacer assembly, thus enabling other roll grooves to be aligned with the mill pass line. The change in overall axial length of the spacer assembly is achieved without removing components which once removed, are susceptible to being lost or damaged.

Other objects and advantages of the present invention will become more apparent as the description proceeds with the aid of the accompanying drawings, wherein.

Figure 1:
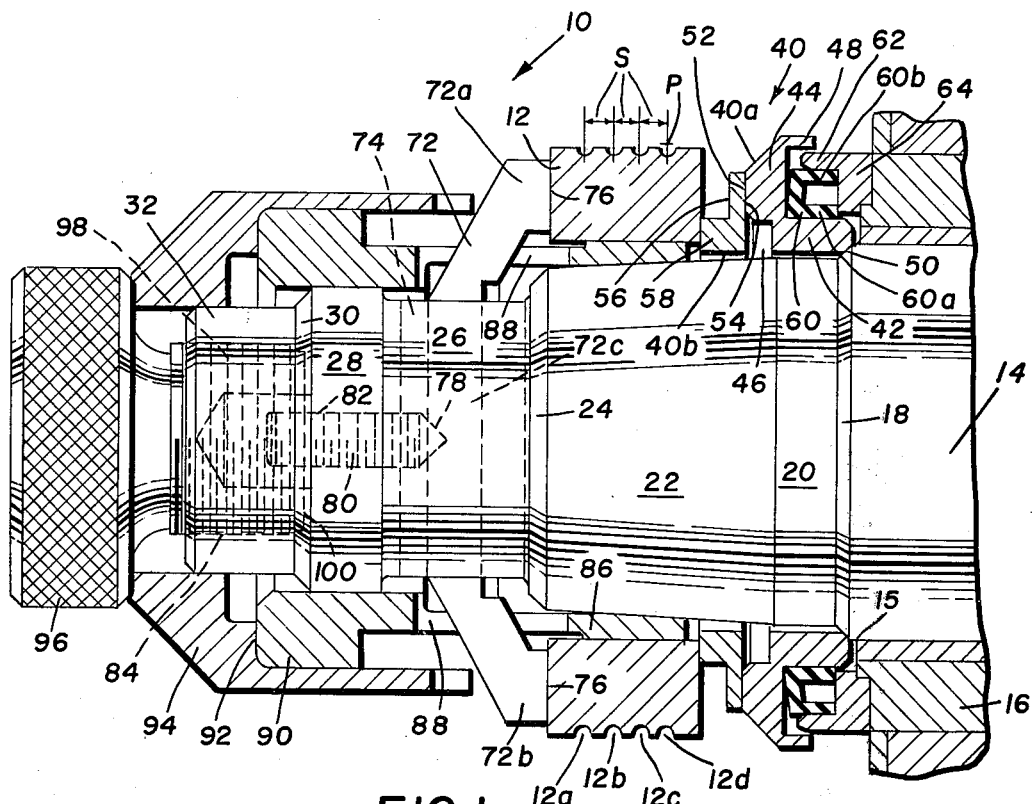
FIG. 1 is a sectional view through a roll mounting apparatus embodying the concepts of the present invention, with one roll groove aligned with the mill pass line.

With reference initially to FIG. 1, there is generally indicated at 10 an apparatus for mounting a multi groove work roll 12 on a roll shaft 14. The shaft 14 has an end section which protrudes axially from an opening 15 in a housing 16, the latter containing lubricated shaft bearings, drive mechanisms and other conventional components which are not shown because they form no part of the present invention. As viewed from right to left in FIG. 1, the protruding shaft end section includes a shoulder 18, a short cylindrical section 20 of slightly reduced diameter, a tapered section 22 which leads from section 20 to another shoulder 24, another reduced diameter cylindrical section 26 which leads from shoulder 24 to an enlarged diameter cylindrical section 28, the latter terminating in a shoulder 30 which leads to a cylindrical end 32.

In the arrangement herein shown for illustrative purposes in FIGS. 1-2, the work roll has four axially spaced grooves, 12a, 12b, 12c and 12d on its exterior surface, the latter of which is shown in FIG. 1 in alignment with the mill pass line P. The spacing between the centers of adjacent grooves are all equal to a distance indicated schematically at s. Also, the spacing between the centers of the outside grooves and the adjacent ends of the roll are equal to thereby permit the position of the roll to be reversed on the shaft end.

A spacer assembly generally indicated at 40 is located between the work roll 12 and the locating shoulder 18. The spacer assembly includes axially engaged first and second components 40a and 40b. Component 40a has a circular base section 42 and a radial flange section 44 which is grooved as at 46 and which terminates in an annular lip 48 generally parallel to base section 42. One end of the base section 42 is bevelled as at 50 to engage shoulder 18, and the flange section 44 has a flat face 52 adjacent to circular groove 46.

Figure 2A:
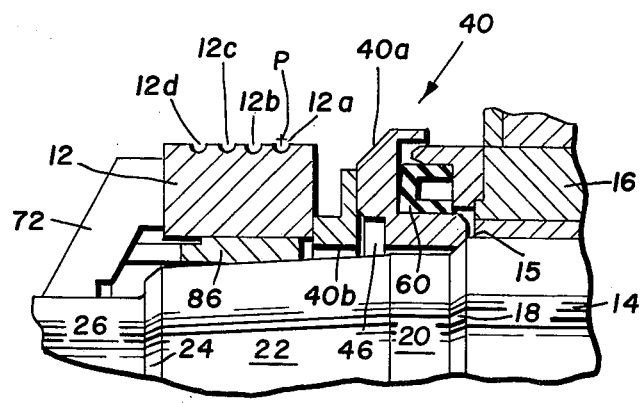
FIGS. 2A-2C are further partial illustrations of the apparatus shown in FIG. 1, showing the different component adjustments required to align the remaining roll grooves with the mill pass line; and, FIG. 3 is a sectional view showing the spacer assembly of the present invention employed with a three groove roll.

Component 40b has a generally L-shaped cross-section formed by a radial flange having opposed flat surfaces 54 and 56, the latter joining an axially protruding base shoulder 58. When the components are arranged as shown in FIGS. 1 and 2A, the flat surface 52 of component 40a is in face-to-face engagement with the flat surface 58 of component 40b, and the end of the base shoulder 58 on component 40b is in engagement with the work roll 12.

Component 40a carries a flexible seal 60 on the exterior surface of the base section 42. Seal 60 is rotatable with component 40a, and has inner and outer flanges 60a and 60b, the former being in sealing engagement with base section 42, and the latter being in sealing engagement with a flange 62 on a seal ring 64 attached to housing 16. Flange 62 cooperates with lip 48 to provide a sealing labyrinth which when combined with the sealing action of resilient seal 60 and the surfaces in contact therewith, is effective to retain bearing lubricant in the housing 16 while at the same time excluding exterior contaminants such as cooling water, mill scale, etc. from the housing.

A retainer means or assembly is employed to hold: component 40a against shoulder 18; component 40b against component 40a; and, roll 12 against component 40b. The retainer means includes a key 72 extending through an enlarged transverse slot 74 in the shaft section 26. Key 72 has two legs 72a, 72b which engage the work roll 12 at 76, and an intermediate section 72c whose width is less than that of slot 74. The intermediate key section 72c has a depression 78 adapted to receive the shaped end of a socket head screw 80. Screw 80 is threaded into an axial threaded bore 82 leading from the transverse slot 74 to another larger diameter threaded bore 84 in the shaft end 32.

A collet member 86 is seated axially between the work roll 12 and the tapered section 22 of the roll shaft. The collet has an intermediate tubular section which is slotted at opposite locations as at 88 to accommodate the key 72 and a head 90 which is engaged as at 92 by a cap member 94. The cap member 94 is in turn held in place by the knurled head 96 of a large diameter threaded stud 98 which is received in threaded bore 84. The end of the stud 98 is recessed as at 100 to accommodate the socket head screw 80.

In light of the above, it will be seen that with spacer element 40 in place and with the socket head screw 80 and the threaded stud 98 properly tightened as shown in FIG. 1, the work roll 12 will be fixed relative to the roll shaft 14 in an operative position with its roll groove 12d in alignment with the mill pass line. This arrangement is maintained until the roll groove 12d becomes worn, at which point alternate grooves can be employed in the following manner:

Groove 12a

With reference to FIG. 2A, it will be seen that groove 12a can be aligned with the mill pass line P by simply reversing the roll 12. This is accomplished by removing stud 98, cap 94, collet 86 and key 72, reversing the roll 12, and then reassembling the foregoing components.

Groove 12b

Figure 2B:
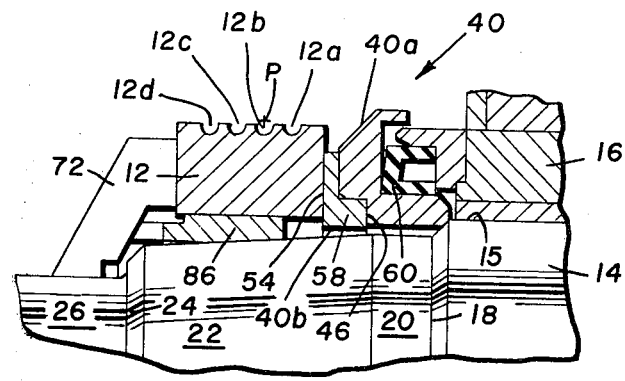

When the two outside grooves 12d and 12a are worn, and it becomes necessary to employ one of the inside grooves, for example groove 12b, the roll is removed in the manner described above. This having been accomplished, component 40b is reversed endwise relative to component 40a to locate the base shoulder 58 in axial insertion in groove 46, as shown in FIG. 2B. Thereafter the roll is remounted and pushed against the flat surface 54 of component 40b, the net result being an axial shift of the roll 12 towards shoulder 18 through a distance equal to the width of base shoulder 58, which is equal to the spacing s between adjacent roll grooves. Thus, the roll groove 12b is now in alignment with the mill pass line P.

Groove 12c

Figure 2C:
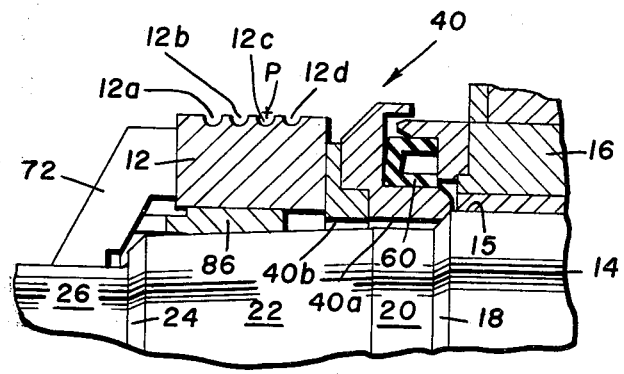

As shown in FIG. 2C, groove 12c may be brought into alignment with the mill pass line P by reversing the position of the roll from that shown in FIG. 2B.

Figure 3:
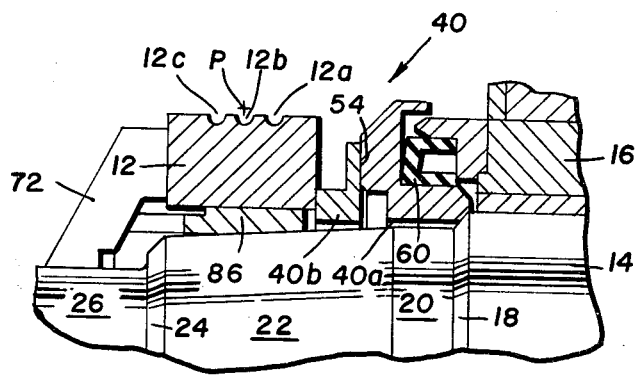

In light of the above, it will now be understood by those skilled in the art that use of the present invention is not restricted to multi groove rolls having four grooves. To illustrate, FIG. 3 is a view showing the invention employed with a multi groove roll having three grooves 12a, 12b and 12c. Here, component 40b would be arranged as shown while rolling with the center groove 12b. Thereafter, the component 40b would be reversed endwise, and the roll pushed into engagement with flat face 54 to roll in groove 12a, and then by reversing the roll, to roll in groove 12c.

It will thus be seen that at all times, the components 40a and 40b remain in use, with component 40b being reversible endwise to accomplish a desired axial shift of the work roll relative to the locating shoulder 18 on shaft 14. The position of component 40a remains unchanged, thus permitting this component to serve not only as a spacer, but also as part of a seal assembly which effectively contains bearing lubricants in the housing 16 while excluding contaminants such as cooling water and mill scale.

It is my intention to cover all changes and modifications to the embodiments herein chosen for purposes of disclosure which do not depart from the spirit and scope of the invention.

I claim:

1. In a rolling mill, apparatus for mounting a multi groove work roll on the end section of a roll shaft in an operative position with one of the roll grooves in alignment with the mill pass line, said apparatus comprising: locating means on the roll shaft, a spacer assembly positioned between and engageable at opposite ends respectively with said locating means and with one end of a multi groove work roll which is axially received on the roll shaft, and retaining means engageable with the roll shaft for holding the work roll against said spacer assembly in a fixed position on said shaft, said spacer assembly including first and second components, with the overall axial length of said spacer assembly being changeable by axially reversing one of said components relative to the other of said components.

2. The apparatus as claimed in claim 1 wherein said first component has one end adapted for engagement with said locating means and an opposite end adapted for engagement with either end of said second component.

3. The apparatus as claimed in claim 2 wherein the said opposite end of said first component is adapted to axially received at least a portion of one end of said second component.

4. The apparatus as claimed in claim 3 wherein said roll shaft protrudes axially from a housing containing lubricated shaft bearings, and wherein said first component comprises one section of a seal for retaining lubricant in said housing.

5. The apparatus as claimed in claim 3 wherein the said portion has an axial length equal to the axial spacing between adjacent grooves on said work roll.

6. The apparatus as claimed in claim 2 wherein the said opposite end of said first component is provided with a groove adapted to receive a shoulder protruding axially from one end of said second component.

7. The apparatus as claimed in claim 6 wherein the opposite end of said second component terminates in a flat face perpendicular to the rotational axis of the roll shaft.

8. The apparatus as claimed in claim 2 wherein the said opposite end of said first component defines a first flat surface and an adjacent circular groove, said second component having a generally L-shaped cross-section forming a second flat surface at one end thereof and a third flat surface with an adjacent axially protruding shoulder at the other end thereof, said second and third flat surfaces being adapted for alternate engagement with said first flat surface, said shoulder being adapted to be axially received in said groove when said third flat surface is in engagement with said first flat surface.

9. The apparatus as claimed in claim 8 wherein the axial length of said shoulder is equal to the axial spacing between adjacent grooves on said work roll.

10. In a rolling mill, apparatus for mounting a multi groove work roll on the end section of a roll shaft in an operative position with one of the roll grooves in alignment with the mill pass line, said apparatus comprising: a locating shoulder on said roll shaft; a spacer assembly comprising first and second cooperatively engagable components, said first component having one end adapted for engagement with said locating shoulder and an opposite end forming a groove with an adjacent flat first surface arranged in a plane perpendicular to the roll axis, said second component having a generally L-shaped cross-section forming a second flat surface at one end thereof and a third flat surface with an adjacent axially protruding base shoulder at the other end thereof, said second and third flat surfaces being parallel to and adapted for alternate engagement with said first flat surface, said base shoulder having an axial length equal to the distance between the centers of adjacent grooves on said work roll and being adapted to be axially received in said groove when said third flat surface is in engagement with said first flat surface; and retaining means engageable with said roll shaft for holding said work roll against said spacer assembly in a fixed position on said roll shaft.

* * * * *